US012717882B2

(12) United States Patent
Lindberg Nilsson et al.

(10) Patent No.: US 12,717,882 B2
(45) Date of Patent: Aug. 25, 2026

(54) METHOD FOR PROTECTING DATA OF A USER IN A VEHICLE AND A VEHICLE

(71) Applicants: Ningbo Geely Automobile Research & Development Co., Ltd., Ningbo (CN); Zhejiang Geely Holding Group Co., Ltd., Zhejiang (CN)

(72) Inventors: Erik Lindberg Nilsson, Gothenburg (SE); Johan Setterberg, Gothenburg (SE)

(73) Assignees: NINGBO GEELY AUTOMOBILE RESEARCH & DEVELOPMENT CO., LTD., Ningbo (CN); ZHEJIANG GEELY HOLDING GROUP CO., LTD., Zhejiang (CN)

( * ) Notice: Subject to any disclaimer, the term of this patent is extended or adjusted under 35 U.S.C. 154(b) by 31 days.

(21) Appl. No.: 18/747,900

(22) Filed: Jun. 19, 2024

(65) Prior Publication Data

US 2024/0346154 A1 Oct. 17, 2024

Related U.S. Application Data

(63) Continuation of application No. PCT/CN2022/139348, filed on Dec. 15, 2022.

(30) Foreign Application Priority Data

Dec. 30, 2021 (EP) .................................... 21218328

(51) Int. Cl.
*G06F 21/10* (2013.01)
*B60R 21/013* (2006.01)
*G06F 21/60* (2013.01)

(52) U.S. Cl.
CPC ............ *G06F 21/10* (2013.01); *B60R 21/013* (2013.01); *G06F 21/60* (2013.01)

(58) Field of Classification Search
CPC ....... G06F 21/10; G06F 21/60; B60R 21/013; H04W 12/10; H04L 63/04
See application file for complete search history.

(56) References Cited

U.S. PATENT DOCUMENTS

| | | | | |
|---|---|---|---|---|
| 7,672,756 B2 * | 3/2010 | Breed | .................... | G07C 5/008 701/1 |
| 8,880,239 B2 | 11/2014 | Kleve et al. | | |
| 9,069,933 B1 * | 6/2015 | August | ................... | G06F 21/79 |
| 10,559,148 B2 | 2/2020 | Fujiwara | | |
| 10,906,506 B2 * | 2/2021 | Troia | .................... | G06Q 50/40 |

(Continued)

OTHER PUBLICATIONS

International Search Report from corresponding International Application No. PCT/CN2022/139348, mailed Feb. 8, 2023, 3 pages.

(Continued)

*Primary Examiner* — Pramila Parthasarathy
(74) *Attorney, Agent, or Firm* — Tucker Ellis LLP

(57) ABSTRACT

A method for protecting data of a user in a vehicle, wherein the vehicle has a first memory, a distress sensor system, a processing circuitry operatively connected to memory and the distress sensor system, wherein the memory stores personal data linked to the user, the method including, at the processing circuitry: detecting a signal of distress from the distress sensor system; in response to detecting the distress signal, automatically protecting the data linked to the user that is stored on the first memory.

10 Claims, 2 Drawing Sheets

(56) References Cited

U.S. PATENT DOCUMENTS

| | | | | |
|---|---|---|---|---|
| 11,314,858 | B2 * | 4/2022 | McMaster | G06F 21/88 |
| 2008/0186184 | A1 | 8/2008 | August et al. | |
| 2014/0288781 | A1 | 9/2014 | Horiguchi | |
| 2017/0050617 | A1 | 2/2017 | Penilla et al. | |
| 2019/0202399 | A1 | 7/2019 | Troia et al. | |
| 2020/0117798 | A1 | 4/2020 | McMaster et al. | |
| 2021/0146881 | A1 | 5/2021 | Troia et al. | |

OTHER PUBLICATIONS

International Preliminary Report on Patentability from corresponding International Application No. PCT/CN2022/139348, complted Mar. 7, 2027, 5 pages.

* cited by examiner

METHOD FOR PROTECTING DATA OF A USER IN A VEHICLE AND A VEHICLE

RELATED APPLICATION DATA

This application is a continuation of International Patent Application No. PCT/CN2022/139348, filed Dec. 15, 2022, and claims the benefit of European Patent Application No. 21218328.9, filed Dec. 30, 2021, the disclosures of which are incorporated herein by reference in their entireties.

TECHNICAL FIELD

The present disclosure relates to a method for protecting data of a user in a vehicle and a vehicle. More specifically, the disclosure relates to a method for protecting data of a user in a vehicle and a vehicle as defined in the introductory parts of the independent claims.

BACKGROUND

Car sharing has become more and more common. LYNK&CO have car sharing in the European market, m.co is another company focusing on car sharing between end users. Also VOI is dealing in the same business, except that they don't rent cars. On top of this, many companies offer services, such as car cleaning/washing, delivery services, etc.

When dealing with these kinds of services, some information may be needed to be stored in the vehicle. Due to user integrity it is important that this information is visible only to the correct person. As an example: The owner of a car may have full access to see all user profiles in a vehicle. However, if a rider uses a service during their booking period, the owner may not be eligible for knowing all information about that service. A further example is that when using a cleaning service is that the user ordering the service may only have an interface to the cleaning service, but all employees at that cleaning service shall not have access to the car, only the one performing the work. The ordering user shall however not have access to see what employee that is performing the service.

There is thus a need for improved data security in the vehicle industry.

SUMMARY

It is an object of the present disclosure to mitigate, alleviate or eliminate one or more of the above-identified deficiencies and disadvantages in the prior art and to solve at least the above mentioned problem. According to a first aspect there is provided a method for protecting data of a user in a vehicle, wherein the vehicle comprises a first memory, a distress sensor system, a processing circuitry operatively connected to memory and the distress sensor system, wherein the memory comprises personal data linked to the user, the method comprising, at the processing circuitry: detecting a signal of distress from the distress sensor system; in response to detecting the distress signal, automatically protecting the data linked to the user that is stored on the first memory.

An advantage is that the data is protected in case the car has to be abandoned by the user without any chance to secure or protect sensitive data linked to the user.

According to some embodiments the distress sensor system is a Safety Restraint System, wherein the distress signal is a signal indicative of a vehicle crash. The inventors have realized that while a very common approach is to save as much data as possible from a crash, some data is not relevant to determine a cause of the crash and the signal may be used to enable that sensitive data does not fall in the wrong hands. An advantage is that salvaged components containing sensitive data may be prevented from being re-used without authorization.

According to some embodiments, the distress signal is caused by a detected burglary, e.g. a signal from a burglary system of the vehicle. The data linked to the user is then protected if the burglar tries to steal the data linked to the user or if the user has to flee from the vehicle, e.g. if the vehicle is car jacked.

According to some embodiments, the distress signal is caused by a detected sudden health change of the driver, e.g. a detected heart attack, if the user falls asleep or loses consciousness. The data linked to the user is then protected in case the user has to leave the vehicle or if the condition causes an accident.

According to some embodiments, the distress signal is caused by the vehicle drive assisting systems determining that a severe crash is imminent and unavoidable. The information for the determination can come from cameras, radar, proximity sensors etc. available in the vehicle. An advantage is that time is saved so that the protection of the data linked to the user before a crash may interfere with the protection procedure.

According to some embodiments, the distress signal is received from a remote source. In that way the data linked to the user is protected if a distress is detected by a remote surveillance of the vehicle. It could be an anticipation of a severe accident, crime, a disaster of some sort that the vehicle is deemed to run into. It could also be based on a detected hacking of the vehicle software, theft, or a detected hijacking of the vehicle.

According to some embodiments, the data linked to the user is protected by logging out the user from the vehicle system. In that way the data linked to the user is protected from unauthorized persons.

According to some embodiments, the data linked to the user is protected by deleting the data from the memory. In that way the data linked to the user is securely removed from vehicle so that no one can read it ever again.

According to some embodiments, the vehicle further comprises wireless communication means operatively connected to the processing circuitry, wherein in response to detecting the distress signal, before deleting the data linked to the user that is stored on the memory, uploading the data linked to the user to the original equipment manufacturer (OEM) to be stored and collected after verification of the identity of the user (to be used for insurance reasons). In that way the data linked to the user is backed up so that it is can be recovered by the user later on.

According to some embodiments, the vehicle further comprises a small explosive device arranged adjacent the memory, the method further comprises: in response to detecting the distress signal, triggering the explosive device to explode, thereby destroying the memory and all data on it. In that way the data linked to the user is completely destroyed from all attempts of recovery.

According to some embodiments, the explosive device is a squib. A squib is normally used for airbags and is thereby tested and certified for vehicles already.

The Safety Restraint System of modern vehicles are equipped with circuits that can be used to trigger one or multiple explosive devices when triggered by the distress system. By using existing circuits in a novel and inventive way costs are reduced the environmental foot print is kept to a minimum.

According to some embodiments, the vehicle comprises a multiple memories storing data linked to the user, wherein the method further comprises: in response to detecting the distress signal, automatically delete or protect the data linked to the user that is stored on every memory. An advantage with this embodiment is that all data on every part of the vehicle system is protected or deleted.

According to some embodiments, the multiple memories storing data linked to the user are located in devices wirelessly connected to the vehicle via e.g. Bluetooth or Wi-Fi. The devices are disconnected in response to detecting a distress signal.

According to some embodiments, each of the multiple memories are part of a dedicated system in the vehicle, wherein the processing circuitry is configured to in response to detecting the distress signal, send a dedicated delete signal to all equipment in the vehicle the method comprises memories storing data linked to the user.

According to a second aspect there is provided a vehicle comprising a first memory, a distress sensor system, a processing circuitry operatively connected to memory and the distress sensor system, wherein the memory comprises personal data linked to the user, the method comprising, wherein the processing circuitry is configured to: detect a signal of distress from the distress sensor system; in response to detecting the distress signal, automatically delete the data linked to the user that is stored on the first memory.

An advantage is that the data is protected in case the car has to be abandoned by the user without any chance to secure or protect sensitive data linked to the user.

According to some embodiments, the distress signal is caused by a detected burglary. The data linked to the user is then protected if the burglar tries to steal the data linked to the user or if the user has to flee from the vehicle, e.g. if the vehicle is car jacked.

According to some embodiments, the vehicle further comprises wireless communication means operatively connected to the processing circuitry, wherein the processing circuitry is configured to in response to detecting the distress signal, before deleting the data linked to the user that is stored on the memory, upload the data linked to the user to the OEM to be stored and collected after verification of the identity of the user (to be used for insurance reasons). In that way the data linked to the user is backed up so that it is can be recovered by the user later on.

According to some embodiments, the vehicle further comprises a small explosive device arranged adjacent the memory, the processing circuitry is configured to: in response to detecting the distress signal, triggering the explosive device to explode, thereby destroying the memory all data on it. In that way the data linked to the user is completely destroyed from all attempts of recovery.

According to some embodiments, the explosive device is a squib. A squib is normally used for airbags and is thereby tested and certified for vehicles already.

According to some embodiments, the vehicle comprises a multiple memories storing data linked to the user, wherein the processing circuitry is configured to: in response to detecting the distress signal, automatically delete the data linked to the user that is stored on every memory. An advantage with this embodiment is that all data on every part of the vehicle system is protected or deleted.

According to some embodiments, the each of the multiple memories are part of a dedicated system in the vehicle, wherein the processing circuitry is further configured to in response to detecting the distress signal, send a dedicated delete signal to all equipment in the vehicle, the vehicle comprises memories storing data linked to the user. An advantage with this embodiment is that all data on every part of the vehicle system is protected or deleted.

Effects and features of the second aspect are to a large extent analogous to those described above in connection with the first aspect. Embodiments mentioned in relation to the first aspect are largely compatible with the second aspect.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

DETAILED DESCRIPTION OF EXAMPLE EMBODIMENTS

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

Figure 1:
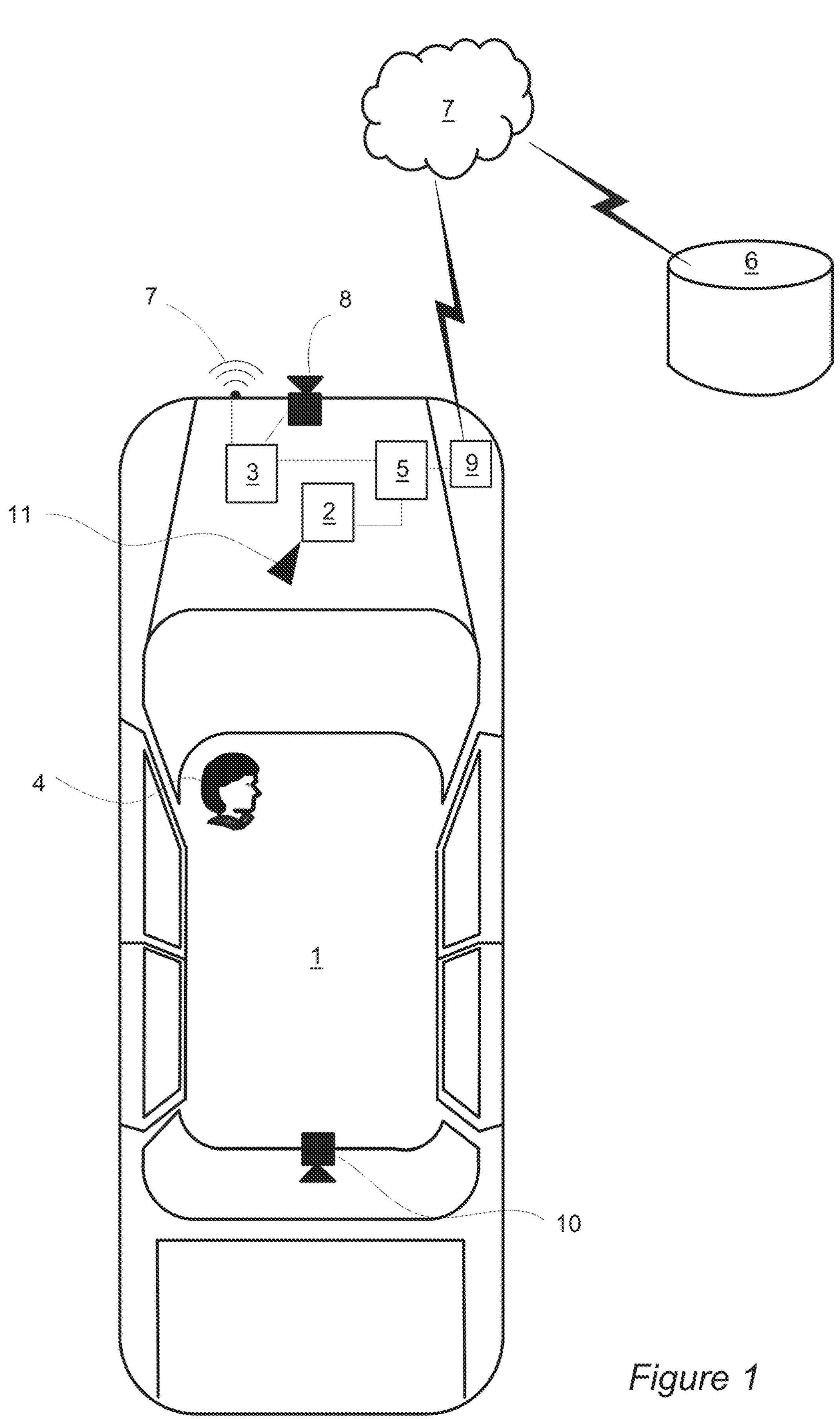
FIG. 1 shows a schematic drawing of a vehicle according to an embodiment of the present disclosure.

FIG. 1 shows the second aspect of this disclosure shows a vehicle 1 comprising a first memory 2, a distress sensor system 3, a processing circuitry 5 operatively connected to memory and the distress sensor system, wherein the memory comprises personal data linked to the user, the method comprising, wherein the processing circuitry 5 is configured to: detect a signal of distress from the distress sensor system;

in response to detecting the distress signal, automatically delete the data linked to the user that is stored on the first memory.

The distress signal may be caused by a crash of the vehicle, detected by a sensor in the vehicle. The distress signal may also be caused by a detected burglary, e.g. on a signal from a burglary system in the vehicle. The distress signal may be caused by the vehicle drive assisting systems with cameras 8, 10, radar 7, proximity sensors 7 etc. determining that a severe crash is imminent and unavoidable.

The distress signal may also be received from a remote source via the wireless communication means 9. It may be the vehicle OEM deleting the vehicle in case of hack, theft, hijacking, etc.

The vehicle further comprises wireless communication means 9 operatively connected to the processing circuitry 5, wherein the processing circuitry 5 is configured to in response to detecting the distress signal, before deleting the data linked to the user that is stored on the memory, upload the data linked to the user via a network 7 to an OEM server 6 to be stored and collected after verification of the identity of the user to be used for insurance reasons.

The vehicle further comprises a small explosive device 11 arranged adjacent the memory 2, the processing circuitry 5 is configured to: in response to detecting the distress signal, triggering the explosive device to explode (after OEM upload if set), thereby destroying the memory all data on it. The explosive device is in FIG. 1 a squib normally used for airbags.

The vehicle of FIG. 1 comprises multiple memories (not shown) storing data linked to the user, wherein the processing circuitry 5 is configured to: in response to detecting the distress signal, automatically delete the data linked to the user that is stored on every memory. Each of the multiple memories are part of a dedicated system in the vehicle, wherein the processing circuitry 5 is further configured to in response to detecting the distress signal, send a dedicated delete signal to all equipment in the vehicle the vehicle comprises memories storing data linked to the user.

Figure 2:
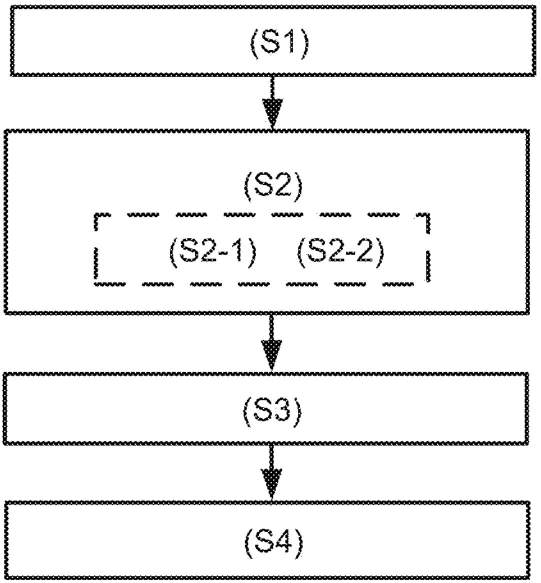
FIG. 2 shows a flow chart of a method according to an embodiment of the present disclosure.

The first aspect of this disclosure is disclosed in FIG. 2, showing a method for protecting data of a user in a vehicle 1, wherein the vehicle comprises a first memory 2, a distress sensor system 3, a processing circuitry 5 operatively connected to memory and the distress sensor system, wherein the memory comprises personal data linked to the user, the method comprising, at the processing circuitry 5: detecting S1 a signal of distress from the distress sensor system; in response to detecting the distress signal, automatically protecting S2 the data linked to the user that is stored on the first memory.

The data is protected by logging S2-1 out the user from the vehicle system or by deleting S2-2 the data.

The vehicle further comprises wireless communication means operatively connected to the processing circuitry 5, wherein in response to detecting the distress signal, before deleting the data linked to the user that is stored on the memory, uploading S3 the data linked to the user to the OEM to be stored and collected after verification of the identity of the user to be used for insurance reasons.

The vehicle further comprises a small explosive device 11 arranged adjacent the memory 2, the method further comprises: in response to detecting the distress signal, triggering S4 the explosive device to explode (after OEM upload if set), thereby destroying the memory and all data on it.

The Safety Restraint System of modern vehicles are equipped with circuits that can be used to trigger one or multiple explosive devices when triggered by the distress system. By using existing circuits in a novel and inventive way costs are reduced the environmental foot print is kept to a minimum.

The vehicle may comprise multiple memories storing data linked to the user, wherein the method further comprises: in response to detecting the distress signal, automatically delete the data linked to the user that is stored on every memory. Each of the multiple memories are part of a dedicated system in the vehicle, wherein the processing circuitry 5 is configured to in response to detecting the distress signal, send a dedicated delete signal to all equipment in the vehicle the method comprises memories storing data linked to the user.

The person skilled in the art realizes that the present disclosure is not limited to the preferred embodiments described above. The person skilled in the art further realizes that modifications and variations are possible within the scope of the appended claims. For example, explosive devices may be positioned at every memory containing data that should be destroyed according to the invention. Other remote locations than an OEM could be used for uploading a backup of data before deleting it, e.g. a service provider of the vehicle, a personal cloud for the user, etc. . . . Additionally, variations to the disclosed embodiments can be understood and effected by the skilled person in practicing the claims, from a study of the drawings, the disclosure, and the appended claims.

What is claimed is:

1. A vehicle comprising:

a memory, a distress sensor system having at least a sensor configured to detect a crash of the vehicle, and a processing circuitry operatively connected to the memory and the distress sensor system, wherein the memory comprises personal data linked to a user, wherein the processing circuitry is configured to protect data of the user in the event of detection of the crash of the vehicle by:

detecting a distress signal from the distress sensor system; and in response to detecting the distress signal, automatically deleting the data linked to the user that is stored on the memory; and wherein the distress signal is generated in response to the sensor detecting the crash of the vehicle.

2. The vehicle according to claim 1, wherein the distress sensor system is a Safety Restraint System.

3. The vehicle according to claim 1, wherein the processing circuitry is further configured to delete the data linked to the user upon detection of a burglary by the distress sensor system.

4. The vehicle according to claim 1, wherein the processing circuitry is further configured to delete the data linked to the user upon detection of an imminent and unavoidable crash by the distress sensor system.

5. The vehicle according to claim 1, wherein the processing circuitry is further configured to protect the data linked to the user by logging the user out of a vehicle system to which the user was logged in prior to the crash.

6. The vehicle according to claim 1, wherein the vehicle further comprises wireless communication means operatively connected to the processing circuitry, wherein in response to detecting the distress signal, before deleting the data linked to the user that is stored on the memory, uploading the data linked to the user to an original equipment manufacturer (OEM) of the vehicle to be stored.

7. The vehicle according to claim 1, wherein the vehicle further comprises an explosive device arranged adjacent the memory and the processing circuitry, in response to detecting the distress signal, triggers the explosive device to explode to destroy the memory and all data on the memory.

8. The vehicle according to claim 7, wherein the explosive device is a squib.

9. The vehicle according to claim 1, wherein the vehicle comprises multiple memories that each store data linked to the user, wherein the method further comprises:

in response to detecting the distress signal, the processing circuitry automatically deleting the data linked to the user that is stored on each of the multiple memories.

10. The vehicle according to claim 9, wherein the each of the multiple memories are part of a respective dedicated system in the vehicle, wherein the processing circuitry is configured to:

in response to detecting the distress signal, send a dedicated delete signal to each dedicated system in the vehicle having one of the memories to delete the data linked to the user.

* * * * *